United States Patent
Vasseur et al.

(10) Patent No.: US 11,552,886 B2
(45) Date of Patent: Jan. 10, 2023

(54) TOPOLOGY OPTIMIZATION IN SD-WANS WITH PATH DOWNGRADING

(71) Applicant: Cisco Technology, Inc., San Jose, CA (US)

(72) Inventors: Jean-Philippe Vasseur, Saint Martin d'Uriage (FR); Grégory Mermoud, Venthône (CH); Vinay Kumar Kolar, San Jose, CA (US); Jürg Nicolaus Diemand, Pfaffikon (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/196,429

(22) Filed: Mar. 9, 2021

(65) Prior Publication Data

US 2022/0294730 A1 Sep. 15, 2022

(51) Int. Cl.
| | | |
|---|---|---|
| *H04L 45/00* | (2022.01) | |
| *H04L 41/5019* | (2022.01) | |
| *H04L 45/50* | (2022.01) | |
| *H04L 45/12* | (2022.01) | |
| *H04L 12/46* | (2006.01) | |
| *H04L 41/12* | (2022.01) | |
| *H04L 41/22* | (2022.01) | |
| *H04L 45/302* | (2022.01) | |

(52) U.S. Cl.
CPC .......... *H04L 45/50* (2013.01); *H04L 12/4633* (2013.01); *H04L 41/12* (2013.01); *H04L 41/22* (2013.01); *H04L 41/5019* (2013.01); *H04L 45/123* (2013.01); *H04L 45/302* (2013.01); *H04L 45/566* (2013.01)

(58) Field of Classification Search
None
See application file for complete search history.

(56) References Cited

U.S. PATENT DOCUMENTS

| | | | |
|---|---|---|---|
| 10,880,186 B2 | 12/2020 | Kumaran et al. | |
| 2010/0091671 A1* | 4/2010 | Lidstrom | H04L 41/5009 370/252 |
| 2016/0028616 A1* | 1/2016 | Vasseur | H04L 47/50 370/412 |
| 2017/0222918 A1* | 8/2017 | Sebastian | H04L 45/56 |
| 2017/0230291 A1* | 8/2017 | Lee | H04L 65/80 |
| 2018/0359172 A1* | 12/2018 | Yadav | H04L 41/16 |
| 2019/0036813 A1* | 1/2019 | Shenoy | H04L 41/5019 |

(Continued)

FOREIGN PATENT DOCUMENTS

WO 2020252390 12/2020

*Primary Examiner* — Joshua Joo
(74) *Attorney, Agent, or Firm* — Behmke Innovation Group LLC; Kenneth J. Heywood; Jonathon P. Western

(57) ABSTRACT

In one embodiment, a controller for a network receives, via a user interface, a downgrade policy for the network that specifies an objective for path downgrades in the network. The controller identifies traffic of an application conveyed by an edge router in the network via a particular path in the network and using a first type of link. The controller predicts an effect of downgrading the particular path from using the first type of link to using a second type of link to convey the traffic of the application. The controller causes the edge router to convey the traffic of the application via the second type of link, when the effect predicted by the controller satisfies the objective specified by the downgrade policy.

20 Claims, 11 Drawing Sheets

(56) References Cited

U.S. PATENT DOCUMENTS

| | | | | |
|---|---|---|---|---|
| 2019/0036814 A1* | 1/2019 | Aranha | .................... | H04L 45/64 |
| 2019/0130327 A1* | 5/2019 | Carpenter | ............ | G06F 9/45558 |
| 2019/0320369 A1* | 10/2019 | Yang | .................... | H04W 36/22 |
| 2020/0153701 A1* | 5/2020 | Mohan | ................ | H04L 47/2425 |
| 2020/0213185 A1* | 7/2020 | Hughes | ............... | H04L 41/0686 |
| 2020/0213199 A1* | 7/2020 | Sethi | .................... | H04L 41/0889 |
| 2020/0296029 A1* | 9/2020 | Shenoy | ................... | H04L 43/12 |
| 2020/0304411 A1* | 9/2020 | Tang | ........................ | H04L 47/26 |
| 2020/0382387 A1 | 12/2020 | Pasupathy et al. | | |
| 2020/0382402 A1 | 12/2020 | Kolar et al. | | |
| 2021/0037427 A1* | 2/2021 | Hughes | ............... | H04L 12/2801 |
| 2021/0044530 A1* | 2/2021 | Dhanabalan | ............ | H04L 45/70 |

\* cited by examiner

TOPOLOGY OPTIMIZATION IN SD-WANS WITH PATH DOWNGRADING

TECHNICAL FIELD

The present disclosure relates generally to computer networks, and, more particularly, to topology optimization in software-defined wide area networks (SD-WANs) with path downgrading.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

Optimizing the topology of an SD-WAN or other network is relatively straightforward, when only factors such QoS path metrics are considered. However, the notion of 'optimization' may also encompass other factors, as well. For instance, consider the case in which the network operator has a subjective preference for certain types of links, service providers, or the like. In this case, the subjective preferences of the network operator may even run contrary to the optimization of the QoS path metrics (e.g., a disfavored path actually offers the 'best' QoS metrics). Thus, topology optimization that takes into account multiple factors may actually entail 'downgrading' certain paths, so as to satisfy the overall objectives of the network operator.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
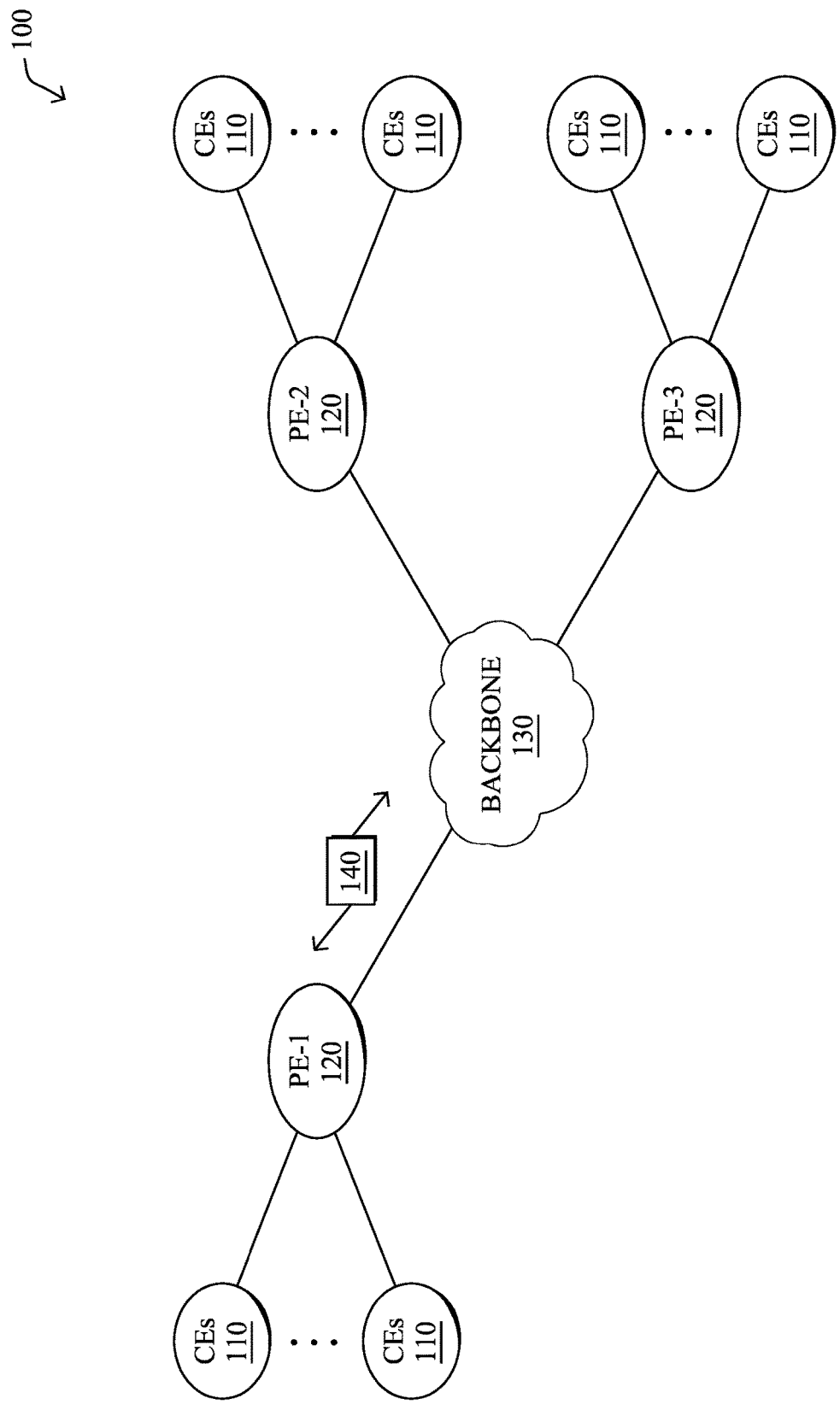
FIGS. 1A-1B illustrate an example communication network.

According to one or more embodiments of the disclosure, a controller for a network receives, via a user interface, a downgrade policy for the network that specifies an objective for path downgrades in the network. The controller identifies traffic of an application conveyed by an edge router in the network via a particular path in the network and using a first type of link. The controller predicts an effect of downgrading the particular path from using the first type of link to using a second type of link to convey the traffic of the application. The controller causes the edge router to convey the traffic of the application via the second type of link, when the effect predicted by the controller satisfies the objective specified by the downgrade policy.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
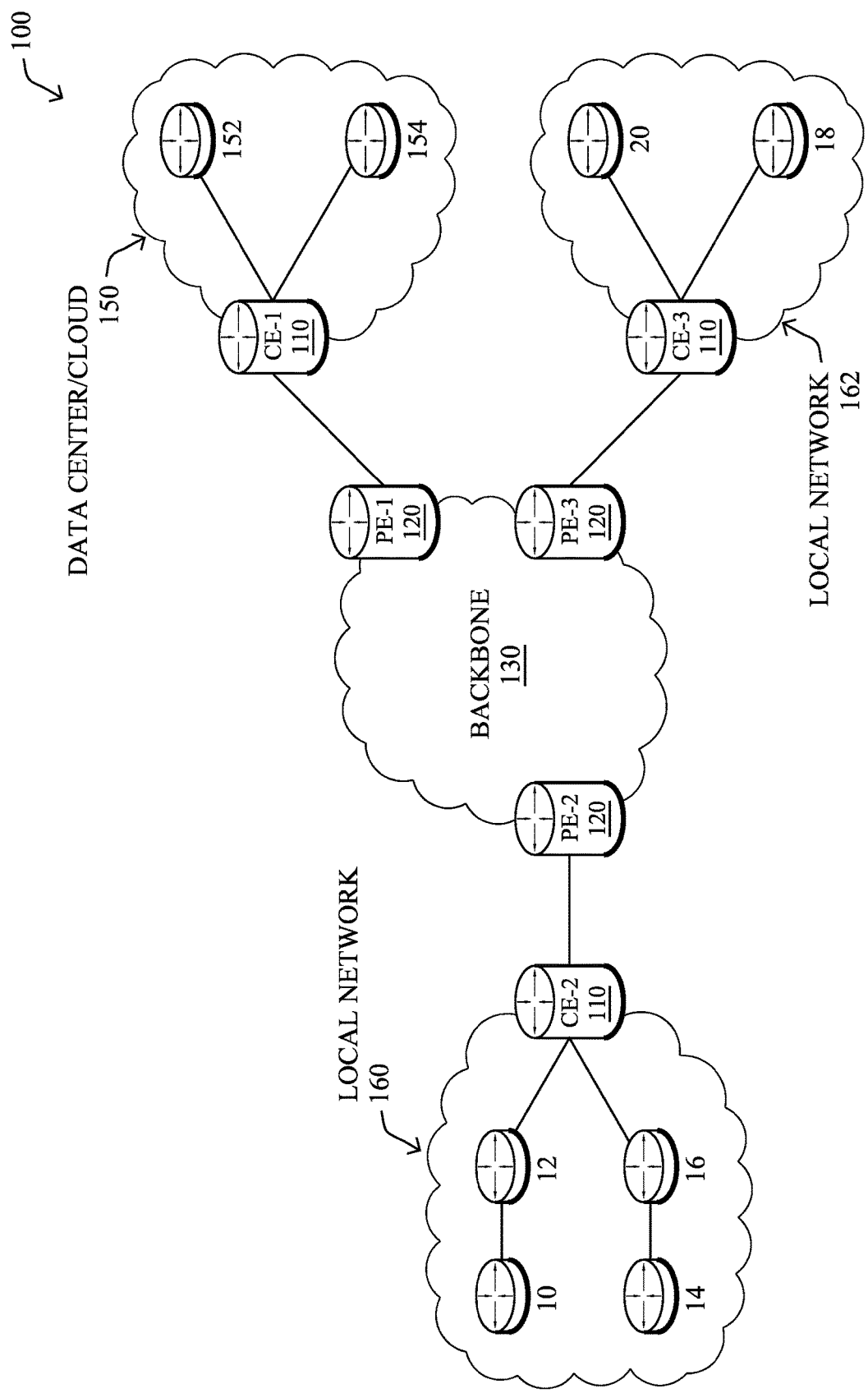

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
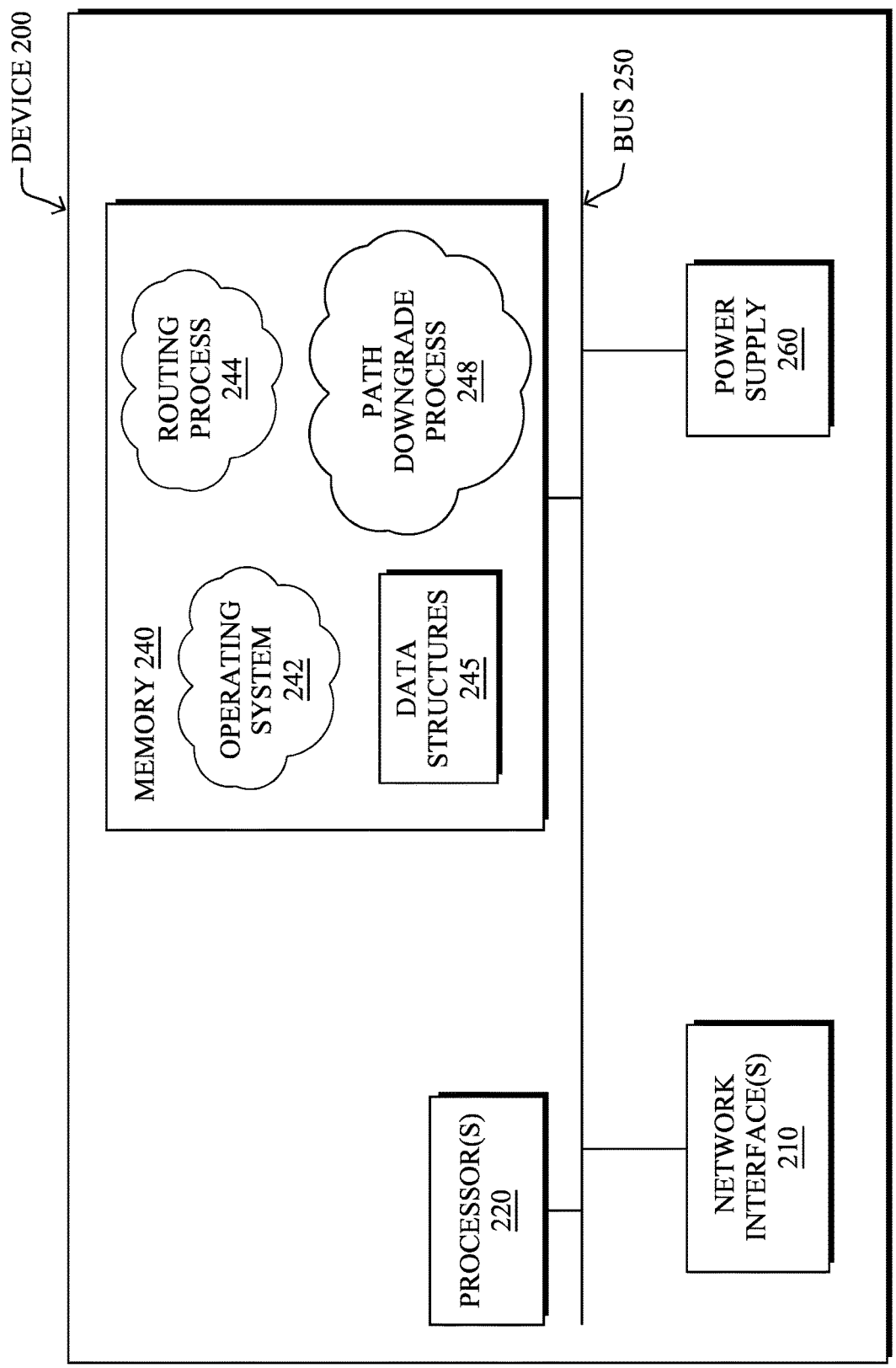
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a path downgrade process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or path downgrade process 248 may also include computer executable instructions that, when executed by processor(s) 220, cause device 200 to perform the techniques described herein. To do so, in some embodiments, routing process 244 and/or path downgrade process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or path downgrade process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or path downgrade process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
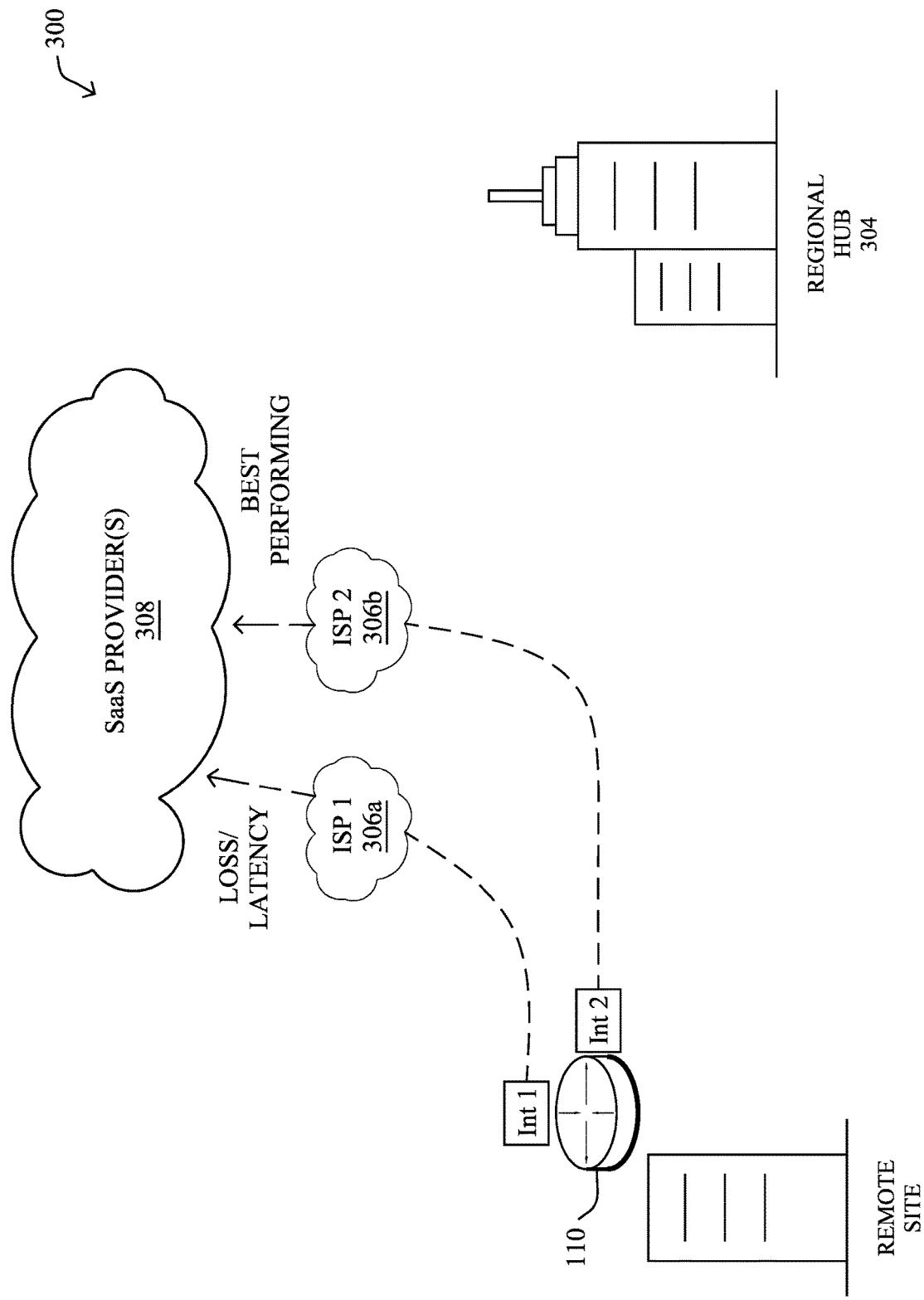
FIGS. 3A-3B illustrate example network deployments.
Figure 3B:
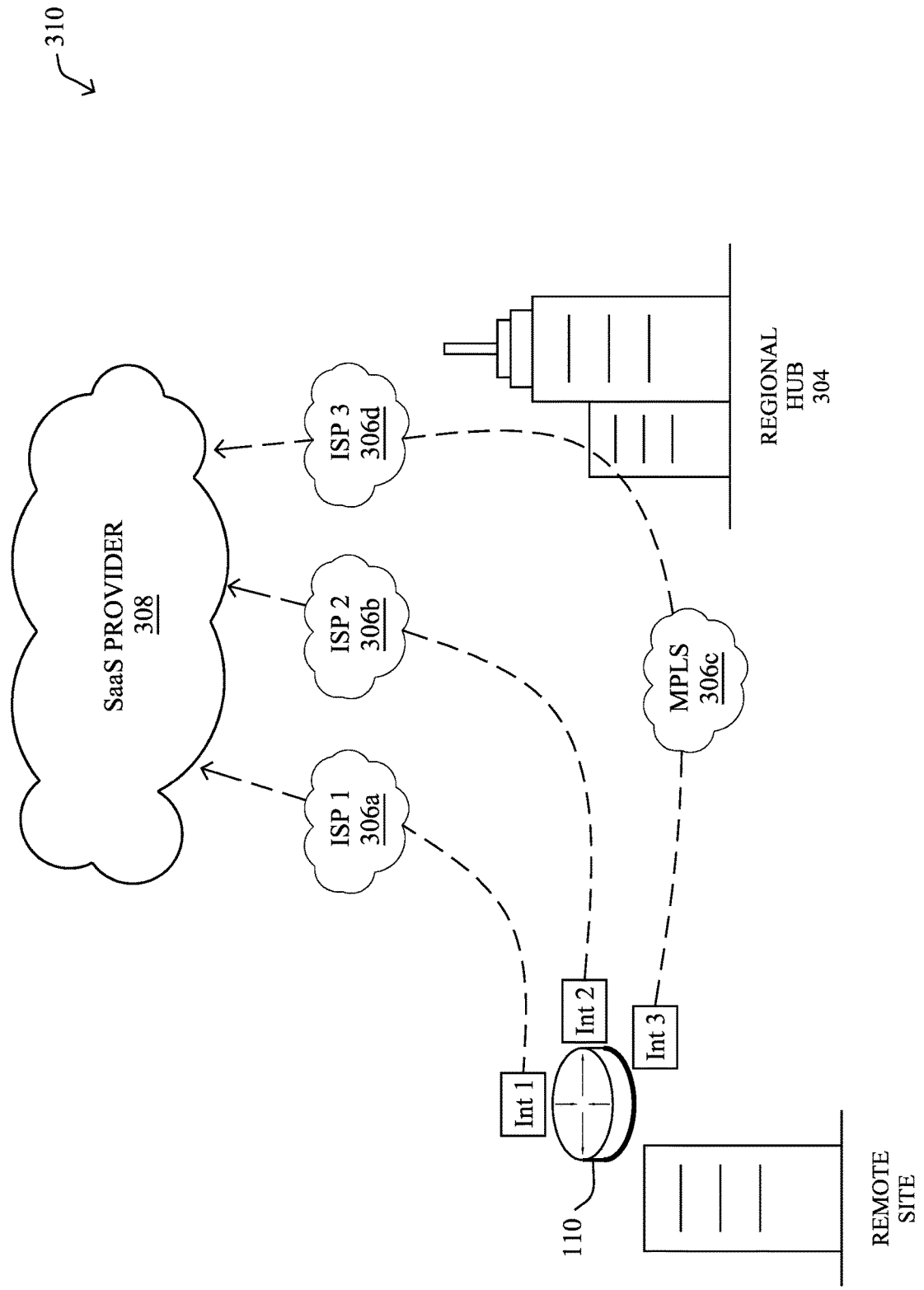

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
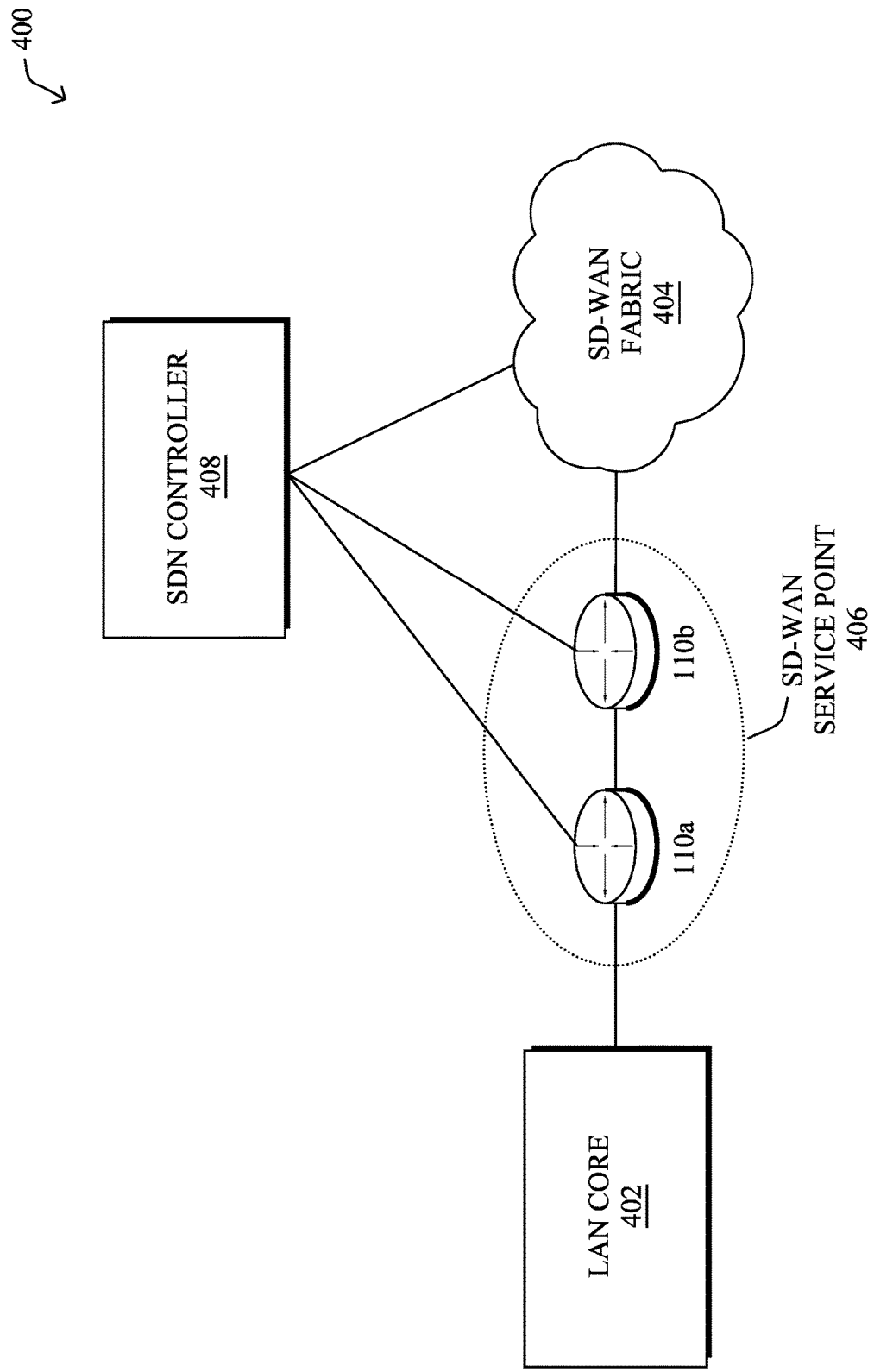
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

The SLA for the application is 'guessed,' using static thresholds.

Routing is still entirely reactive: decisions are made using probes that reflect the status of a path at a given time, in contrast with the notion of an informed decision.

SLA failures are very common in the Internet and a good proportion of them could be avoided (e.g., using an alternate path), if predicted in advance.

Figure 4B:
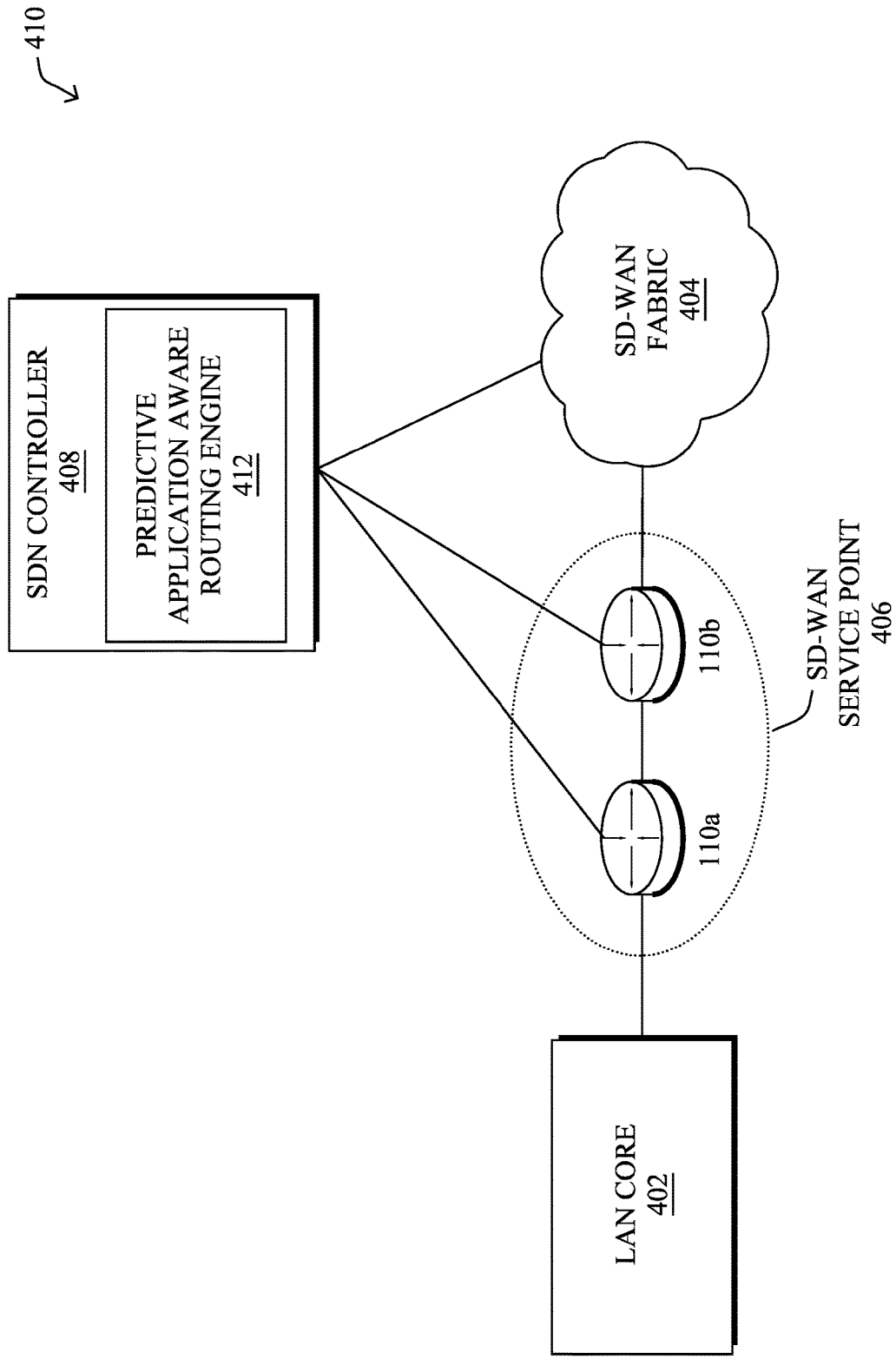

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or path downgrade process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

As noted above, many SD-WANs and other networks now utilize different types of links, such as MPLS links, Internet links, backup cellular links, and the like. Generally, speaking, it is often assumed that certain types of links provide better performance than others. For instance, MPLS-based tunnels are often assumed to perform better than Internet-based tunnels. While this generalization may hold in some circumstances, this may not always be the case. Indeed, preliminary testing has shown that approximately 32% of the MPLS-based tunnels do not provide a significantly better SLA than that of their Internet-based counterparts, 99% of the time.

Figure 5A:
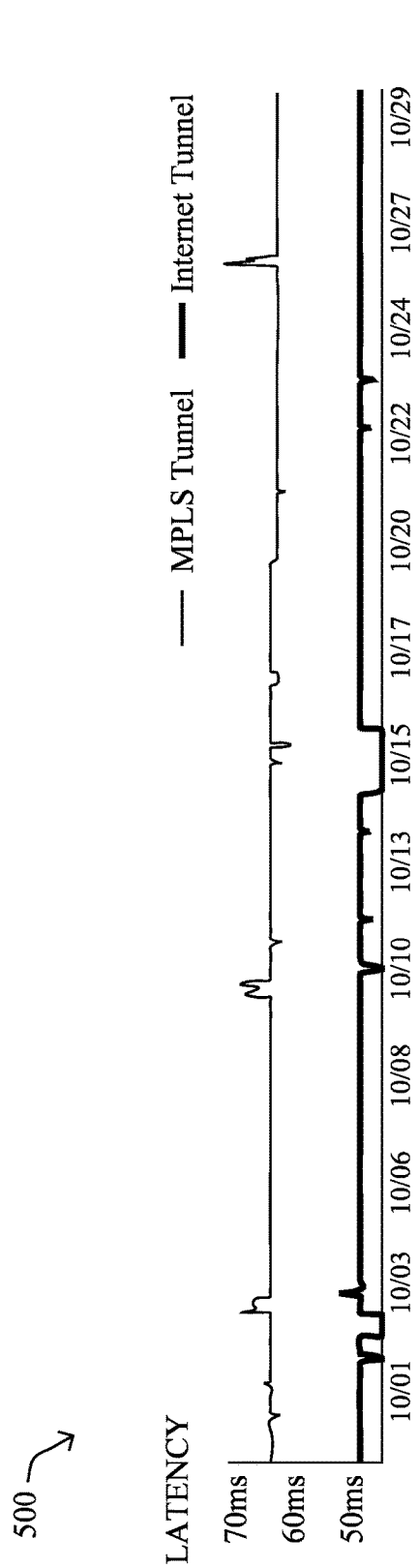
FIGS. 5A-5C illustrate example plots of path metrics for Multiprotocol Label Switching (MPLS) and Internet tunnels.
Figure 5B:
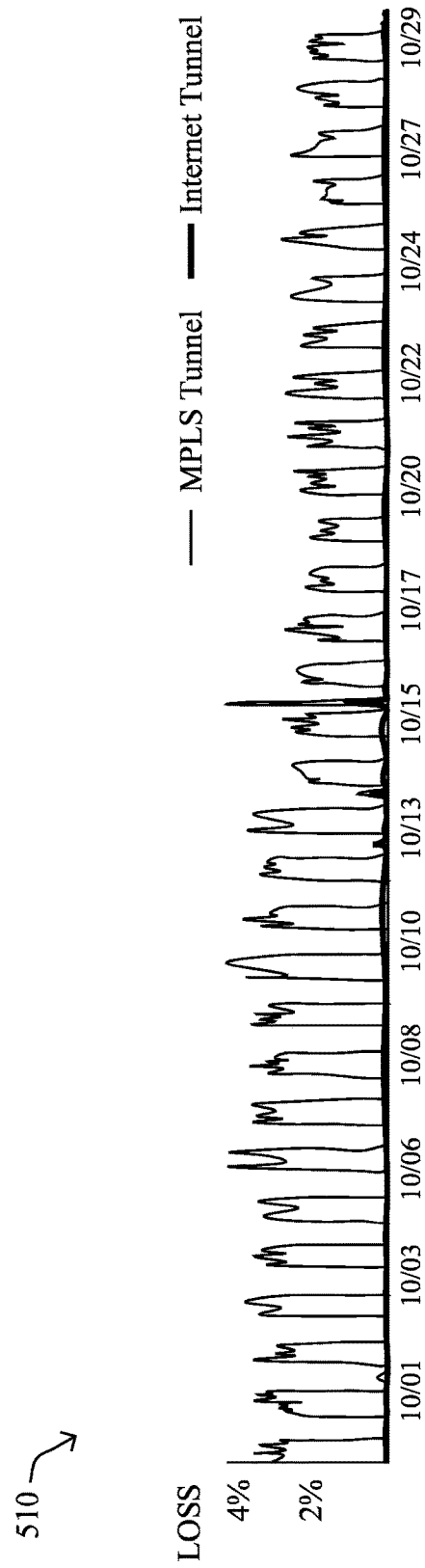
Figure 5C:
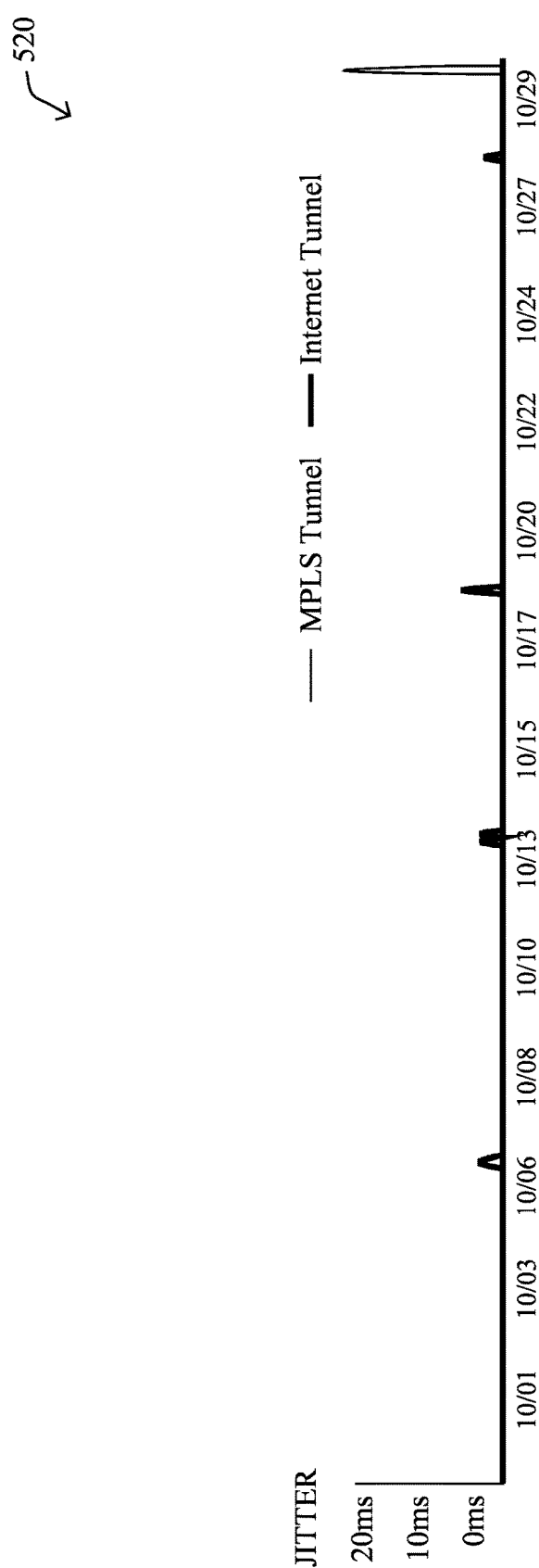

By way of example, FIGS. 5A-5C illustrates plots 500, 513, and 520, respectively, showing the observed loss, latency, and jitter measured over time between two edge routers in a live network over an MPLS-based tunnel and over an Internet-based tunnel. As shown in plot 500 in FIG. 5A, the Internet-based tunnel between the routers universally exhibits better latency than the MPLS-based tunnel over the measured time period. Similarly, in plot 510 in FIG. 5B, the loss observed on the MPLS-based tunnel was almost always greater than that of the Internet-based tunnel. Finally, in plot 520 in FIG. 5C, while the MPLS-based tunnel exhibited slightly better jitter metrics than that of the Internet-based tunnel for some time, that tunnel also exhibited a large spike in jitter towards the end of the observed period.

While topology optimization approaches typically take into account whether the QoS metrics of the available paths will best satisfy the SLAs of the application traffic, this approach often fails to satisfy the notion of 'optimization' held by the network operator. For instance, the network operator may prefer Internet-based tunnels over MPLS-based tunnels, may view the SLAs of certain applications more flexible than others (e.g., SLA violations for certain types of traffic may be acceptable, etc.), or like. This means that there are certainly opportunities within many networks to 'downgrade' paths from one type to another, while still being considered optimal from the standpoint of the network operator.

Topology Optimization in SD-WANs with Path Downgrading

The techniques introduced herein a mechanism to explore and implement network topology changes so as to satisfy a notion of optimization that takes into account multiple factors. For instance, the techniques herein may consider the SLAs associated with the application traffic in the network, an order of preference for different types of links (e.g., a preference for Internet, etc.), acceptable levels of risk in terms of probabilities of no longer satisfying an SLA, combinations thereof, or the like. In turn, the system may apply dynamic routing changes to implement the computed topologies. In further aspects, the techniques herein also propose the use of observation periods to validate that the modified topology satisfies the stated objectives and confirm whether the modification(s) should be used.

Illustratively, the techniques described herein may be performed by hardware, software, and/or firmware, such as in accordance with path downgrade process 248, which may include computer executable instructions executed by the processor 220 (or independent processor of interfaces 210) to perform functions relating to the techniques described herein (e.g., in conjunction with routing process 244).

Specifically, according to various embodiments, a controller for a network receives, via a user interface, a downgrade policy for the network that specifies an objective for path downgrades in the network. The controller identifies traffic of an application conveyed by an edge router in the network via a particular path in the network and using a first type of link. The controller predicts an effect of downgrading the particular path from using the first type of link to using a second type of link to convey the traffic of the application. The controller causes the edge router to convey the traffic of the application via the second type of link, when the effect predicted by the controller satisfies the objective specified by the downgrade policy.

Figure 6:
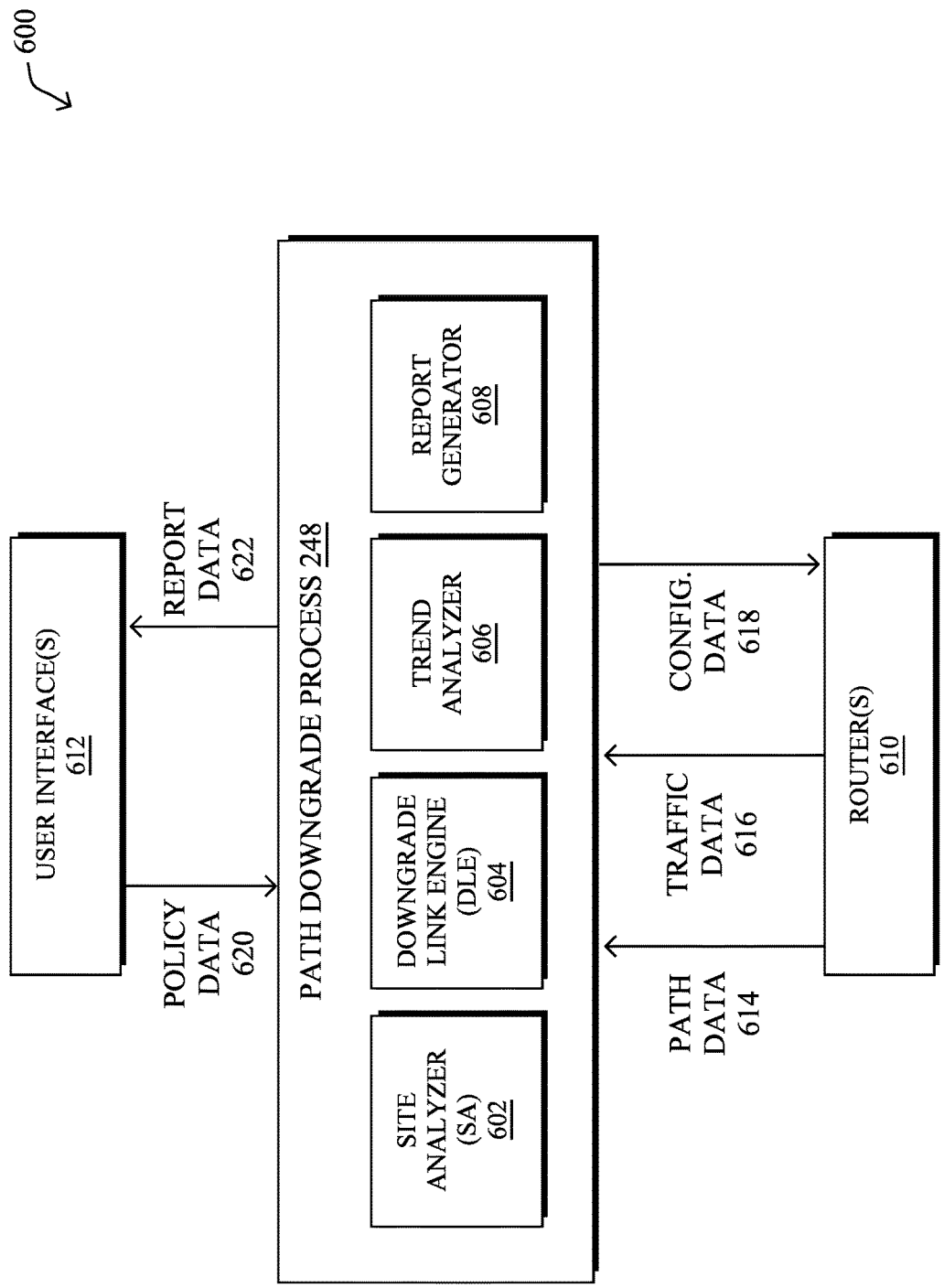
FIG. 6 illustrates an example architecture for downgrading paths in a network.

Operationally, FIG. 6 illustrates an example architecture for downgrading paths in a network, according to various embodiments. At the core of architecture 600 is path downgrade process 248, which may be executed by a controller for a network or another device in communication therewith. For instance, path downgrade process 248 may be executed by a controller for a network (e.g., SDN controller 408 in FIGS. 4A-4B), a particular networking device in the network (e.g., a router, etc.), another device or service in communication therewith, or the like.

As shown, path downgrade process 248 may include any or all of the following components: a site analyzer (SA) 602, a downgrade link engine (DLE) 604, a trend analyzer 606, and/or a report generator 608. As would be appreciated, the functionalities of these components may be combined or omitted, as desired. In addition, these components may be implemented on a singular device or in a distributed manner, in which case the combination of executing devices can be viewed as their own singular device for purposes of executing path downgrade process 248.

According to various embodiments, path downgrade process 248 may communicate with one or more user interfaces 612, either directly or indirectly, to receive policy data 620 specified by a network operator. In general, policy data 620 may specify a downgrade policy for paths in the network. Such a policy may indicate one or more objectives for path downgrade process 248 during its assessment of the network. In various embodiments, an objective may be to favor certain link types over others (e.g., an order of preference for links), SLA-related preferences (e.g., whether the SLA for a certain application should never be violated or at least some violations are acceptable), or the like. For instance, one objective may be to remove all MPLS links for a given service provider, if possible. In another example, a different objective may be to maintain all application SLAs while favoring Internet-based links. As would be appreciated, SLA templates may also be defined on a per-application basis (e.g., voice traffic should have delay <150 ms, jitter <50 ms, and loss <3%). Accordingly, in further cases, the objective of the downgrade policy may be to favor a certain type or types of links, while ensuring that the SLAs of a certain subset of applications are satisfied.

In some embodiments, site analyzer (SA) 602 may ingest path data 614 from the various routers 610 in the network, to identify potential paths that can be downgraded/adjusted for the various sites of the network in accordance with the downgrade policy specified in policy data 620. In general, path data 614 may indicate, for each site, a list of links available at that site. In addition, path data 614 may indicate the type(s) of links available at that site, such as MPLS, MPLS-gold, MPLS-silver, etc., Internet, Internet-gold, Internet-silver, . . . , cable, symmetric digital subscriber line (SDSL), Satellite, Satellite-gold, Satellite silver, . . . , or the like, where 'gold' represents a link plan that promises better performance than a 'silver' link plan, etc. Path data 614 may further indicate the QoS characteristics/metrics of the various paths/links, such as link speed, committed rate, cost, etc.

In turn, SA 602 may use path data 614 to identify potential path downgrades and topology changes, based on the objective of the downgrade policy. For instance, if the objective is to favor a certain type of link over another, SA 602 may identify sites that support both types and are currently using the disfavored type of link.

Downgrade link engine (DLE) 604 may be configured to evaluate specific links among the candidates identified by SA 602, according to various embodiments. To do so, DLE 604 may obtain traffic data 616 regarding the traffic observed for a particular candidate site, $S_i$. In addition, in some embodiments, traffic data 616 may also indicate the various applications associated with that site. Various approaches can be employed to identify the applications, such as various routers 610 (or other device) employing deep packet inspection (DPI), using Network Based Application Recognition (NBAR) by Cisco Systems, Inc. or another suitable application recognition mechanism.

DLE 604 may map the list of applications observed for the site to the required SLA(s) specified for the site, if any. As a reminder, DLE 604 may be required to only ensure that the SLA for a given type of traffic e.g., voice) is satisfied, while degradation of the QoS below the SLA threshold may be tolerated for other applications. In another embodiment, the level of acceptable degradation for low priority traffic may be specified by the downgrade policy (e.g. the SLA for voice for the modified topology is required, the SLA for non-transactional traffic may be transgressed by x %, etc.). Note that an additional condition related to the volume of traffic for a given application may also be specified, optionally (e.g. comply with the SLA if the average traffic volume of application A is a least X, etc.).

For each modified topology $T_j(S_i)$, since there may be multiple combinations allowing for cost reductions, DLE 604 may generate a series of routing patches (e.g., changes/exceptions to the existing routing policy). Such patches may be computed using a function returning the probability of SLA violation, considering a set of hypotheses such as the volume of traffic of a given type sent over a given link. Such prediction models may take the form of machine learning-based or statistical models that are typically trained on a per link/tunnel/path basis. To break any ties between links, DLE 604 may also take into account the user-specified link type preferences. For instance, if both an MPLS link and an Internet link are predicted to satisfy the SLA of voice traffic, DLE 604 may favor the link type specified as preferred by the network operator via user interface 612.

In turn, DLE 604 may determine whether the predicted probability of an SLA violation is considered an acceptable risk, according to the downgrade policy. For instance, the network operator may be comfortable with a slight degree of risk of SLA violations for traffic of a non-critical application.

Conversely, the network operator may view another application as critical and not be open to any significant risk of an SLA violation. Note that the degrees of risk may specified by the user, explicitly, or may be predetermined according to some categorical risk level. Such a risk factor is denoted 'r' herein, to signify the level of acceptable risk of an SLA violation for a particular application or category of applications.

Optionally, DLE 604 may also specify a condition on the routing patches elated to the number of occurrences and number of required routing changes, in one embodiment. Indeed, consider the case of a modified topology allowing to remove an MPLS link allowing to reroute traffic onto another set of links, but at the cost or applying a high number of routing policies (patches), and rerouting traffic very often. In such a case, DLE 604 may consider the routing policy as too costly in terms of operation and too hard to monitor for being considered (e.g., as defined in the downgrade policy, on review by the network operator, etc.). Consequently, the system may apply conditions on the number and the nature of the patches that can be used.

If a modified topology satisfies all of the above requirements, then DLE 604 may generate a set of routing patches for the modified topologies $T_j(S_i)$ and enter into an active monitoring phase. The purpose of this active monitoring phase is to check whether the required SLA are met according to the prediction. In some embodiments, this may entail DLE 604 instructing, either directly or indirectly, a router 610 to active probe a link or path (e.g., tunnel), such as using RFD or HTTP probes. Optionally, DLE 604 may activate faster probing that is augmented with DPI, so as to check that the SLAs are still met for a certain application.

In some embodiments, the amount of time of the active monitoring phase may be controlled via a period of observation (PO) parameter, which may also be set in the downgrade policy. Indeed, the critical traffic for which the SLA MUST be preserved may vary over time in terms of patterns. If the traffic pattern for the critical traffic is known using a model to capture the dynamics of the traffic, then such a model may be used to adjust the PO parameter. For example, if the critical traffic is known to be seasonal, then the PO parameter may match the seasonal period. Note that the presence of SaaS application may also greatly influence the PO parameter. Indeed, SaaS destinations are subject to change because of workload shifts. Thus, DLE 604 may set the PO parameter by taking into consideration not only the type of traffic (e.g., whether the traffic is critical), and its related pattern (if known), as well as the destination of such traffic (e.g., private data center vs. SaaS). In the presence of SaaS destinations, DLE 604 may increase the PO parameter, to reduce the probability of SLA violation, should the workload change and the modified topology not be able to meet the SLA.

In yet another embodiment, DLE 604 may check the SLA for the critical traffic using different statistical moments. For example, in one implementation, DLE 604 may compute averages over X minute time windows may, to check the thresholds specified in the SLA for delay, loss, and/or jitter. Depending on the r factor (e.g., the level of acceptable risk), DLE 604 may also use higher percentiles instead of averages.

At this point, DLE 604 may perform some form of arbitrage between different topologies. For instance, assume that DLE 604 computes the following:

$T_1(S_i)$ with cost $C[T_1(S_i)]$ and probability P1 of not satisfying SLA for critical traffic.

$T_2(S_i)$ with cost $C[T_1(S_i)]$ and probability P2 of not satisfying SLA for critical traffic.

where cost C represents a degree of preference for the particular type of link(s) used by that topology $T_i$. In turn, DLE 604 may assess the risk factors specified in the downgrade policy and the above possible topologies, to best achieve the objective of the policy. Note that automatic strategies may be pre-configured or may be driven explicitly by a user via policy data 620. For instance, in an embodiment where r represents a tradeoff between the number of sessions impacted by a violation and satisfying the order of preference of the network operator (e.g., to favor Internet links over MPLS, etc.), DLE 604 may pick one or the other, depending on the expected number of sessions impacted per month and a scoring based on the order of preference. This number can be estimated by DLE 604, for instance, from historical usage of the site.

Note that, routing patches generated by DLE 604 may also extend beyond simply selecting the 'best' path. Indeed, DLE 604 may even consider relaying traffic between locations, such as in the case of a hub and spoke configuration of the network.

Trend analyzer 606 may be used to determine potential trends in traffic volume of the critical traffic along modified topologies. Indeed, it is often important not to limit the analysis of modified topologies exclusively on the instantaneous values. To that end, trend analyzer 606 may use various statistical tools, in order to estimate the slopes and statistical significances of potential trends. If a sufficiently steep and statistically significant trend is found, then trend analyzer 606 may extrapolate the predicted traffic volume for critical traffic in X months and rerun the process described above by computing the new probability of SLA violation using the patches, but now also considering the future traffic. Another alternative is to effectively generate extra traffic corresponding to the estimated traffic growth, to check whether the estimation of SLA violations on the increased traffic is correct.

Finally, report generator 608 may generate and send report data 622 to user interface(s) 612. In various embodiments, report data 622 may indicate the set of all modified topologies, the level of risk of the SLA for a certain application not being satisfied, and the meeting of any user-specified objectives (e.g., favoring a certain type of connection). In some instances, the user may also have the option to confirm and/or reject any changes by path downgrade process 248, In another embodiment, report data 622 may display one or more dashboards to the user, allowing them insight as to the overall performance of the network on different sites and for different r factors. The user may also make iterative adjustments to the strategies and parameters the user considers the adjusted topology 'optimized.' Once this is the case, the user may also decommission any links that have been deemed superfluous.

Figure 7:
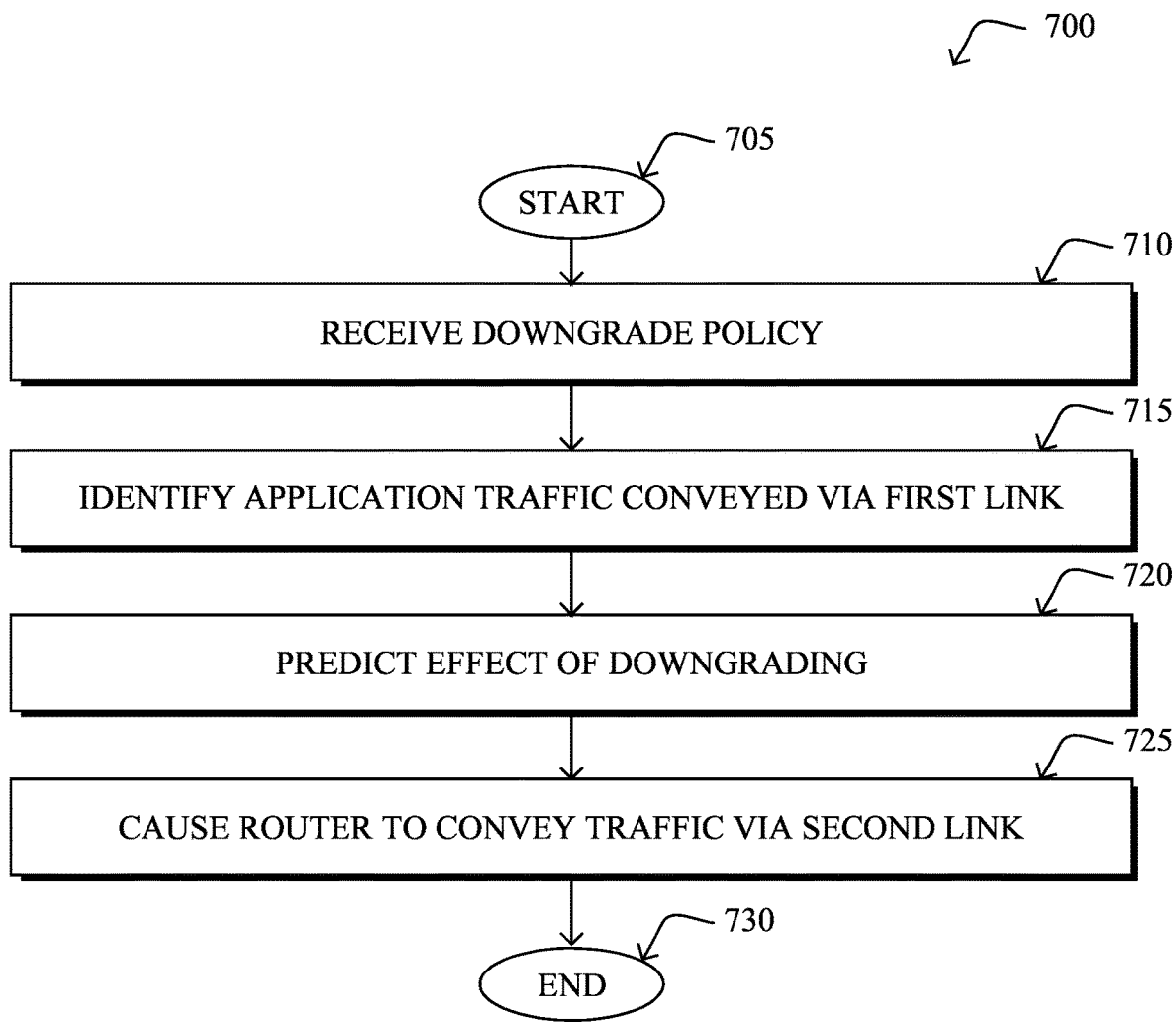
FIG. 7 illustrates an example simplified procedure for downgrading a path in a network.

FIG. 7 illustrates an example simplified procedure 700 for downgrading a path in a network, in accordance with one or more embodiments described herein. For example, a non-generic, specifically configured device (e.g., device 200), such as controller for a network (e.g., an SDN controller or other device in communication therewith), may perform procedure 700 by executing stored instructions (e.g., routing process 244 and/or path downgrade process 248). The procedure 700 may start at step 705, and continues to step 710, where, as described in greater detail above, the controller may receive, via a user interface, a downgrade policy for the network that specifies an objective for path downgrades in the network. In some embodiments, the objective may assign an order of preference to different types of links available in the network (e.g., to favor Internet-based links over MPLS-based links, etc.). In further embodiments, the objective may specify how traffic for a particular application may be evaluated for purposes of topology optimization (e.g., indicating that the SLA of the traffic should not be violated, that the SLA of the traffic can be violated if needed, etc.).

At step 715, as detailed above, the controller may identify traffic of an application conveyed by an edge router in the network via a particular path and using a first type of link. For instance, DPI or another packet inspection mechanism may be used, to identify the application(s) whose traffic is conveyed via the particular path. Associated with the application may be an SLA that specifies the minimum required QoS path metric(s) for the application.

At step 720, the controller may predict an effect of downgrading the particular path from using the first type of link to using a second type of link to convey the traffic of the application, as described in greater detail above. For instance, the controller may leverage a machine learning or statistical prediction model, to assess the effects of moving the application traffic from using the first type of link to the second type of link (e.g., moving the traffic from MPLS to Internet, etc.). In some embodiments, the controller may do so in part by identifying any trends in the volume of the application traffic over the path, so as to also take into account how the volume of traffic may change over time.

At step 725, as detailed above, the controller may cause the edge router to convey the traffic of the application via the second type of link, when the effect predicted by the controller satisfies the objective specified by the downgrade policy. To do so, the controller may send an instruction, either directly or indirectly, to the router that instructs the router to being sending the application traffic via a different link. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the optimization of (SD-WAN) network topologies while allowing for path downgrades. Said differently, the techniques herein allow for multiple factors to be considered when attempting to optimize the topology of a network, including various user preferences of the network operator.

While there have been shown and described illustrative embodiments that provide for the optimization of network topologies with path downgrading, it is to be understood that various other adaptations and modifications may be made within the spirit and scope of the embodiments herein. For example, while certain embodiments are described herein with respect to using certain models for purposes of predicting application experience metrics or SLA violations, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   receiving, at a controller for a network and via a user interface, a downgrade policy for the network that specifies an objective for path downgrades in the network;
   identifying, by the controller, traffic of an application conveyed by an edge router in the network via a particular path in the network and using a first type of link;
   predicting, by the controller and using a machine learning-based or statistical model, an effect of downgrading the particular path from using the first type of link to using a second type of link to convey the traffic of the application via the particular path;
   determining, by the controller, whether the predicted effect of downgrading the particular path from using the first type of link to using the second type of link to convey the traffic of the application via the particular path satisfies the objective specified by the downgrade policy; and
   causing, by the controller and based on the determination, the edge router to convey the traffic of the application via the second type of link.

2. The method as in claim 1, wherein the network comprises a software-defined wide area network.

3. The method as in claim 1, wherein the objective assigns an order of preference to the first type of link and to the second type of link.

4. The method as in claim 1, wherein the particular path comprises a tunnel.

5. The method as in claim 1, wherein the first type of link is a Multiprotocol Label Switching link and the second type of link is an Internet link.

6. The method as in claim 1, wherein the objective specifies that a service level agreement associated with the traffic of the application should be met.

7. The method as in claim 1, further comprising:
   providing, by the controller and to the user interface, data indicative of a level of risk that using the second type of link will not satisfy a service level agreement associated with the traffic of the application, based on the effect predicted by the controller.

8. The method as in claim 1, further comprising:
   monitoring performance of the particular path via active probing, after the edge router begins conveying the traffic of the application via the second type of link.

9. The method as in claim 1, wherein predicting the effect of downgrading the particular path comprises:
   identifying a trend in a volume of the traffic of the application.

10. The method as in claim 1, wherein the objective specifies that a service level agreement associated with the traffic of the application can be violated.

11. An apparatus, comprising:
one or more network interfaces;
a processor coupled to the one or more network interfaces and configured to execute one or more processes; and
a memory configured to store a process that is executable by the processor, the process when executed configured to:
receive, via a user interface, a downgrade policy for a network that specifies an objective for path downgrades in the network;
identify traffic of an application conveyed by an edge router in the network via a particular path in the network and using a first type of link;
predict, using a machine learning-based or statistical model, an effect of downgrading the particular path from using the first type of link to using a second type of link to convey the traffic of the application via the particular path;
determine whether the predicted effect of downgrading the particular path from using the first type of link to using the second type of link to convey the traffic of the application via the particular path satisfies the objective specified by the downgrade policy; and
cause, and based on the determination, the edge router to convey the traffic of the application via the second type of link.

12. The apparatus as in claim 11, wherein the network comprises a software-defined wide area network, and wherein the particular path comprises a tunnel.

13. The apparatus as in claim 11, wherein the objective assigns an order of preference to the first type of link and to the second type of link.

14. The apparatus as in claim 11, wherein the first type of link is a Multiprotocol Label Switching link and the second type of link is an Internet link.

15. The apparatus as in claim 11, wherein the objective specifies that a service level agreement associated with the traffic of the application should be met.

16. The apparatus as in claim 11, wherein the process when executed is further configured to:
provide, to the user interface, data indicative of a level of risk that using the second type of link will not satisfy a service level agreement associated with the traffic of the application, based on the effect predicted by the apparatus.

17. The apparatus as in claim 11, wherein the process when executed is further configured to:
monitoring performance of the particular path via active probing, after the edge router begins conveying the traffic of the application via the second type of link.

18. The apparatus as in claim 11, wherein the apparatus predicts the effect of downgrading the particular path by:
identifying a trend in a volume of the traffic of the application.

19. The apparatus as in claim 11, wherein the objective specifies that a service level agreement associated with the traffic of the application can be violated.

20. A tangible, non-transitory, computer-readable medium storing program instructions that cause a controller for a network to execute a process comprising:
receiving, at the controller and via a user interface, a downgrade policy for the network that specifies an objective for path downgrades in the network;
identifying, by the controller, traffic of an application conveyed by an edge router in the network via a particular path in the network and using a first type of link;
predicting, by the controller and using a machine learning-based or statistical model, an effect of downgrading the particular path from using the first type of link to using a second type of link to convey the traffic of the application via the particular path;
determining, by the controller, whether the predicted effect of downgrading the particular path from using the first type of link to using the second type of link to convey the traffic of the application via the particular path satisfies the objective specified by the downgrade policy; and
causing, by the controller and based on the determination, the edge router to convey the traffic of the application via the second type of link.

* * * * *

UNITED STATES PATENT AND TRADEMARK OFFICE
CERTIFICATE OF CORRECTION

PATENT NO. : 11,552,886 B2
APPLICATION NO. : 17/196429
DATED : January 10, 2023
INVENTOR(S) : Jean-Philippe Vasseur et al.

It is certified that error appears in the above-identified patent and that said Letters Patent is hereby corrected as shown below:

In the Specification

Column 10, Line 17, please amend as shown:
links, backup cellular links, and the like. Generally speak- Column 10, Line 28, please amend as shown:
510, and 520, respectively, showing the observed loss, Column 10, Line 49, please amend as shown:
types of traffic may be acceptable, etc.), or the like. This means Column 12, Line 11, please amend as shown:
(SDSL), Satellite, Satellite-gold, Satellite-silver, …, or the Column 12, Line 37, please amend as shown:
SLA for a given type of traffic (e.g., voice) is satisfied, while Column 12, Line 48, please amend as shown:
For each modified topology $T'_j(S_i)$, since there may be Column 13, Line 10, please amend as shown:
routing patches related to the number of occurrences and Column 13, Line 25, please amend as shown:
for the modified topologies $T'_j(S_i)$ and enter into an active Column 13, Line 31, please amend as shown:
BFD or HTTP probes. Optionally, DLE 604 may activate Signed and Sealed this
Fourth Day of April, 2023

Katherine Kelly Vidal
*Director of the United States Patent and Trademark Office*

CERTIFICATE OF CORRECTION (continued)
U.S. Pat. No. 11,552,886 B2

Column 13, Line 66, please amend as shown:
$T'_1(S_i)$ with cost $C[T'_1(S_i)]$ and probability P1 of not Column 14, Line 1, please amend as shown:
$T'_2(S_i)$ with cost $C[T'_1(S_i)]$ and probability P2 of not Column 14, Line 18, please amend as shown:
Note that routing patches generated by DLE 604 may Column 14, Line 47, please amend as shown:
grade process 248. In another embodiment, report data 622